United States Patent
Yamazaki

[11] Patent Number: 5,927,448
[45] Date of Patent: Jul. 27, 1999

[54] SHOCK ABSORBER

[75] Inventor: Fumio Yamazaki, Saitama, Japan

[73] Assignee: Fuji Seiki Kabushiki Kaisha, Saitama, Japan

[21] Appl. No.: 08/815,275

[22] Filed: Mar. 10, 1997

[30] Foreign Application Priority Data

Mar. 15, 1996 [JP] Japan .................................... 8-086057

[51] Int. Cl.⁶ ........................................................ F16F 9/50
[52] U.S. Cl. ........................................... 188/281; 188/280
[58] Field of Search ................................... 188/281, 266, 188/322.15, 287, 317, 284, 282.1, 322.19, 282

[56] References Cited

U.S. PATENT DOCUMENTS

| | | | |
|---|---|---|---|
| 4,588,054 | 5/1986 | LeBaron ................................... | 188/280 |
| 4,874,066 | 10/1989 | Siberstein ................................. | 188/280 |
| 5,219,414 | 6/1993 | Yamaoka ................................. | 188/284 |
| 5,249,652 | 10/1993 | Leitzman et al. ........................ | 188/282 |
| 5,495,923 | 3/1996 | Bruski et al. ............................ | 188/268 |

FOREIGN PATENT DOCUMENTS 1202884  1/1960  France .................... 188/317

*Primary Examiner*—Robert J. Oberleitner
*Assistant Examiner*—Melanie Salavera
*Attorney, Agent, or Firm*—Steinberg & Raskin, P.C.

[57] ABSTRACT

A shock absorber capable of exhibiting increased shock absorbing characteristics and constantly ensuring desired characteristics irrespective of applications intended. A cylinder is formed therein with a first hollow section of a large diameter and a second hollow section of a small diameter. A piston includes an end wall and a peripheral wall and is formed into a size sufficient to be moved in the second hollow section. The peripheral wall is formed with a plurality of orifices and the end wall is formed with a piston rod insertion through-hole and at least one viscous fluid passage hole. The piston rod is provided thereon with first and second flanges, which are spaced from each other at an interval larger than a thickness of the end wall of the piston and arranged so as to interpose the end wall therebetween. When the piston is moved in a direction in which shock absorbing characteristics are exhibited, the first flange closes the passage hole of the end wall, to thereby cause transfer of viscous fluid to be carried out via only the orifices. The passage hole is open during return movement of the piston, so that a large amount of viscous fluid may be transferred.

11 Claims, 2 Drawing Sheets

SHOCK ABSORBER

BACKGROUND OF THE INVENTION

This invention relates to a shock absorber, and more particularly to a shock absorber adapted to exhibit increased shock absorbing characteristics.

Various kinds of shock absorbers have been conventionally known in the art. The conventional shock absorbers are generally classified into a shock absorber of the single tube structure type including a single cylinder and a shock absorber of the double tube structure type including an outer cylinder and an inner cylinder arranged so as to be spaced at a predetermined interval from the outer cylinder.

The single cylinder type shock absorber is further classified into a channel orifice type wherein a single cylinder is formed on a peripheral surface thereof with a channel-like orifice and a dashpot type wherein a piston is formed into an outer diameter smaller than an inner diameter of a single cylinder, resulting in a gap therebetween constituting an orifice. The double tube structure type shock absorber is generally constructed so that the inner cylinder is formed with a plurality of holes.

The conventional shock absorbers described above are selected depending on a manufacturing cost and/or applications. In general, the shock absorber of the single tube structure type is reduced in manufacturing cost as compared with that of the double tube structure type, since the former is simplified in construction as compared with the latter. However, the dashpot type shock absorber, of the above-described two shock absorbers of the single tube structure type, theoretically fails to exhibit stable shock absorbing characteristics, to thereby cause a variation in characteristics between products to be disadvantageously increased. The channel orifice type shock absorber minimizes such disadvantages of the dashpot type one. However, the channel orifice type shock absorber requires cutting or molding by a die for formation of the channel orifice. Thus, formation of the groove sufficient to permit the channel orifice type shock absorber to exhibit characteristics suitable for applications requires much time and labor as compared with the shock absorber of the double tube structure type wherein characteristics thereof are adjusted by varying the number of holes formed and/or a size thereof.

Nevertheless, the shock absorber of the double tube structure type has a disadvantage of increasing a manufacturing cost. Another disadvantage of the shock absorber of this type is that a diameter of a piston or a thickness of the inner cylinder is reduced when the outer cylinder is formed into the same outer dimensions as the cylinder of the shock absorber of the single tube structure type, because the piston is arranged in the inner cylinder. It would be considered that such a disadvantage is avoided by increasing the outer dimensions of the outer cylinder. However, this causes the shock absorber to be disadvantageously increased in size. Thus, formation of the shock absorber of the double tube structure type into the same outer dimensions as that of the single tube structure type causes shock absorbing characteristics thereof to be reduced as compared with those of the latter. Unfortunately, this often causes damage to the inner cylinder or the like.

OBJECTS AND SUMMARY OF THE INVENTION

The present invention has been made in view of the foregoing disadvantage of the prior art.

Accordingly, it is an object of the present invention to provide a shock absorber which is capable of significantly reducing a manufacturing cost.

It is another object of the present invention to provide a shock absorber which is capable of exhibiting increased shock absorbing characteristics while being down-sized.

It is a further object of the present invention to provide a shock absorber which is capable of accomplishing the above-described objects while employing a single tube structure.

It is still another object of the present invention to provide a shock absorber which is capable of constantly exhibiting desired characteristics irrespective of applications intended.

In accordance with the present invention, a shock absorber is provided. The shock absorber includes a cylinder charged therein with viscous fluid and a piston arranged in the cylinder in a manner to be movable therein. The cylinder is formed therein with a first hollow section of a large diameter and a second hollow section of a small diameter. The piston is formed into a cylindrical shape and has an end wall provided on one end thereof and a peripheral wall connected to the end wall. The piston is formed into an outer diameter which permits the piston to be slidably moved in the second hollow section of the cylinder. The peripheral wall of the piston is formed with a plurality of orifices, so that the viscous fluid is transferred through the orifices upon movement of the piston.

In a preferred embodiment of the present invention, the shock absorber further includes a piston rod and two flanges. The end wall of the piston is formed with at least one viscous fluid passage hole and a piston rod insertion through-hole via which the piston rod is inserted. The flanges are arranged so as to be spaced from each other with the end wall of the piston being interposed between the flanges. One of the flanges is arranged outside the end wall of the piston and formed into a size sufficient to permit the one flange to close the viscous fluid passage hole upon movement of the piston in a direction which permits the shock absorber to exhibit shock absorbing characteristics. The other of the flanges is formed into a configuration which prevents the other flange from closing the viscous fluid passage hole when it is abutted against the end wall of the piston.

Also, in a preferred embodiment of the present invention, the end wall of said piston is formed with at least one viscous fluid passage hole, which includes a small-diameter section and a large-diameter section. The large-diameter section is provide therein with a ball valve. The ball valve is arranged so as to close the small-diameter section during movement of the piston in a direction which permits the shock absorber to exhibit shock absorbing characteristics. Also, the ball valve is arranged so as to be kept separated from the small-diameter section during movement of the piston in a direction of return of the piston.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Now, a shock absorber according to the present invention will be described hereinafter with reference to the accompanying drawings.

Figure 1:
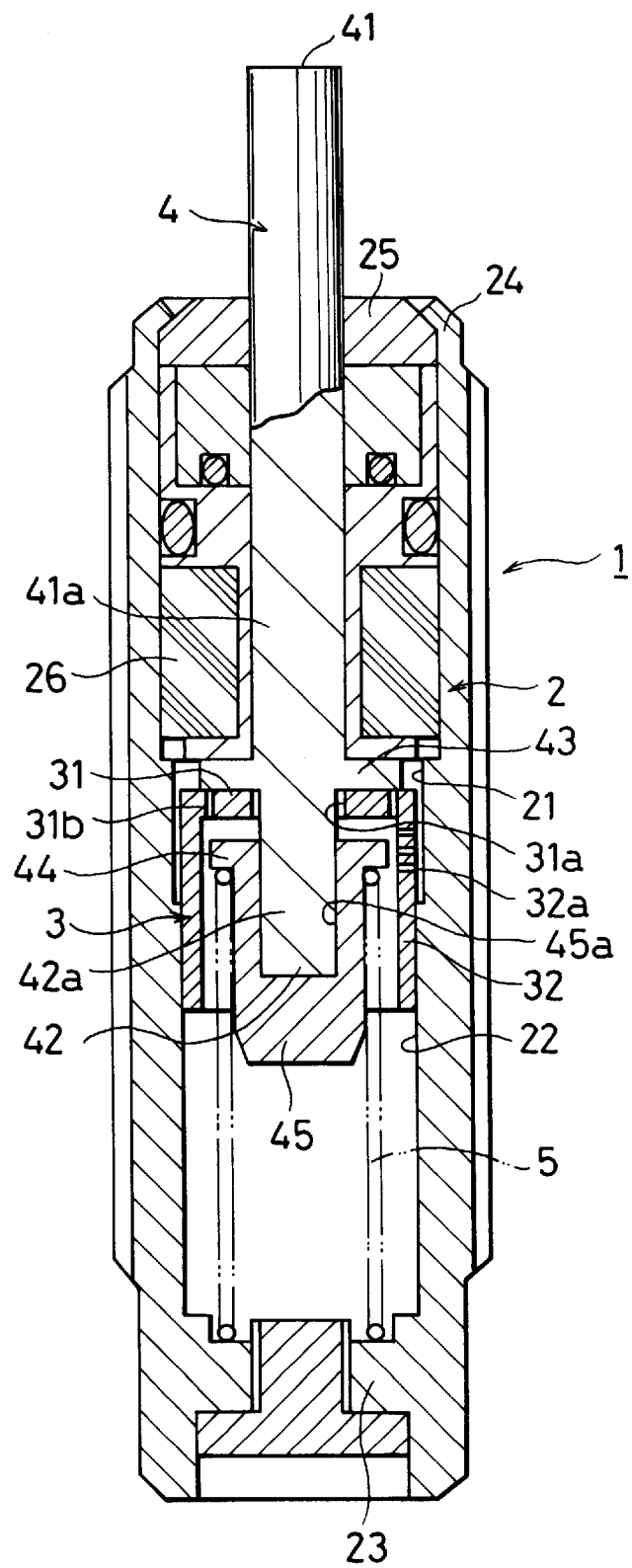
FIG. 1 is a sectional view showing an embodiment of a shock absorber according to the present invention.
Figure 2:
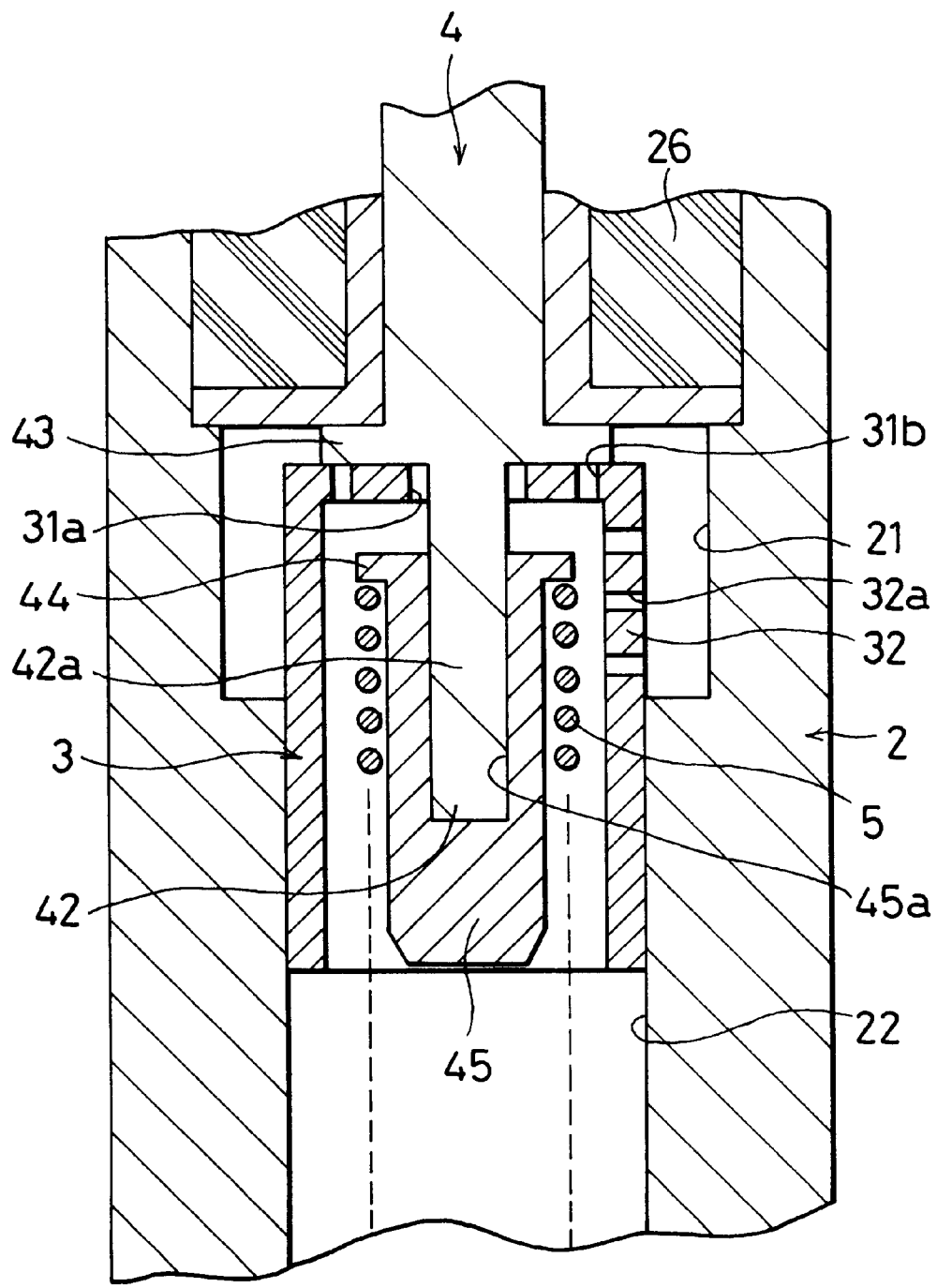
FIG. 2 is a fragmentary enlarged sectional view showing an essential part of the shock absorber shown in FIG. 1.

Referring to FIGS. 1 and 2, an embodiment of a shock absorber according to the present invention is illustrated. A shock absorber of the illustrated embodiment which is generally designated at reference numeral 1 generally includes a cylinder 2, a piston 3 and a piston rod 4.

The cylinder 2 has a first hollow section 21 of a large diameter and a second hollow section 22 of a small diameter formed therein. More particularly, the first hollow section 21 of a large diameter is arranged on a return position side of the piston 3 (an upper side of the cylinder 2 in the illustrated embodiment) and the second hollow section 22 of a small diameter is arranged on a bottom wall side (lower side of the cylinder 2 in the illustrated embodiment). The first hollow section 21 is formed into a diameter larger than an outer diameter of the piston 3 and the second hollow section 22 is formed into a diameter sufficient to permit the piston 3 to be slidably moved therein or a diameter substantially equal to the outer diameter of the piston 3. Thus, the outer diameter of the piston 3 is smaller than the diameter of the first hollow section 21 and substantially equal to the diameter of the second hollow section 22. The first and second hollow section 21 and 22 thus formed cooperate with each other to function as a liquid chamber which is charged therein with viscous liquid or fluid. The cylinder 2 is closed at a lower or bottom end thereof with the bottom wall 23 and provided at the upper end 24 thereof with a cover member 25 in a liquid-tight manner. The cover member 25 is formed with a piston rod guide hole or a through-hole via which the piston rod 4 is outwardly projected. Reference numeral 26 designates an accumulator arranged between the first hollow section 21 and the cover member 25 so as to surround the piston rod 4.

The piston 3 is formed into a hollow cylindrical shape and provided on one end thereof defined on a side of the upper end 24 of the cylinder 2 with an end wall 31 and on the other end thereof defined on a side of the bottom wall 23 of the cylinder 2 with an opening. Thus, the piston 3 is open at the lower end thereof and includes a peripheral wall 32 having such a diameter as described above. The end wall 31 of the piston 3 is formed at a substantially central portion thereof with a piston rod insertion through-hole 31a via which the piston rod 4 is loosely inserted at a distal end thereof. Also, the end wall 31 is formed on a peripheral portion thereof formed with at least one viscous fluid passage hole 31b in the form of a through-hole which permits viscous fluid to flow therethrough. The peripheral wall 32 is formed with a plurality of orifices 32a, which are arranged one after another in an axial direction of the piston 3 and so as to be positioned on the first hollow section 21 when the piston 3 is at the above-described return position or returned to its original position.

The piston rod 4 has a proximal or upper end 41 arranged so as to be outwardly projected through the piston rod guide hole of the cover member 25 described above, as well as a distal end mounted thereon with the piston 3 and provided thereon with two flanges, that is, first and second flanges 43 and 44. The flanges 43 and 44 are arranged so as to be spaced at a predetermined interval from each other. The piston 3 is mounted on the piston rod 4 in such a manner that the end wall 31 thereof is positioned between the flanges 43 and 44.

More specifically, first, the piston rod 4 is provided on a suitable position thereof with the first flange 43 which is formed into a diameter larger than that of the piston rod 4 insertion through-hole 31a of the end wall 31 of the piston 3. Then, the piston rod 4 is formed at a forward portion 42a thereof in proximity to the distal end 42 thereof into a diameter smaller than the piston rod insertion through-hole 31a, so that the forward portion 42a of the piston rod 4 is loosely inserted through the piston rod insertion through-hole 31a, resulting in being positioned in the peripheral wall 32 of the piston 3. The other or second flange 44 is provided on a fit member 45. The fit member 45 is provided separately from the piston rod 4 and formed therein with a fit hole 45a through which the fit member 45 is fitted on the forward portion 42a of the piston rod 4. The second flange 44 is formed into a diameter larger than that of the piston rod insertion through-hole 31a. The first and second flanges 43 and 44 are positioned so as to be spaced from each other at an interval larger than a thickness of the end wall 31 of the piston 3 and arranged in a manner to interpose the end wall 31 of the piston 3 therebetween.

Thus, the first flange 43 is arranged outside the end wall 31 of the piston 3. When the proximal end 41 of the piston rod 4 is forced in a downward direction in FIG. 1, to thereby move the piston 3 in a shock absorbing direction, that is, toward the bottom wall 23 of the cylinder 2 in the illustrated embodiment, the first flange 43 is abutted against the end wall 31 of the piston 3 to close the viscous fluid passage hole 31b. The first flange 43 is not limited to any specific configuration so long as it is formed into a diameter larger than that of the piston rod insertion through-hole 31a. For example, it may be formed so as to be partially projected in correspondence to the viscous fluid passage hole 31b. However, in order to facilitate manufacturing of the first flange 43, it may be generally formed into a substantially circular shape of a diameter sufficient to close the passage hole 31b. Also, in the illustrated embodiment, the first flange 43 is formed into a diameter larger than that of a rearward portion 41a of the piston rod 4 positioned rearward of the first flange 43 and in proximity to the proximal end 41 of the piston rod 4. Alternatively, the piston rod 4 may be so formed that a portion thereof extending from the proximal end 41 through the rearward portion 41a to the first flange 43 has an equal diameter. Also, the first flange 43 may be constituted by an annular member (not shown) formed separately from the piston rod 4 and securely fitted thereon.

The second flange 44, as described above, is arranged so as to be positioned inside the end wall 31 of the piston 3. The second flange 44 may be formed into any desired configuration so long as it does not close the viscous fluid passage hole 31b when the proximal end 41 of the piston rod 4 is released from load applied thereto, to thereby return to its original position. In general, it may be formed into a substantially circular shape having a radius smaller than a distance between a central axis of the piston rod 4 and the passage hole 31b. Such construction of the second flange 44 facilitates manufacturing of the flange 44. Alternatively, the second flange 44 may be formed into a radius larger than the distance between the central axis and the passage hole 31b. In this instance, the second flange 44 is formed at a portion thereof positionally corresponding to the viscous fluid passage hole 31b with any hole or groove (not shown) which ensures flowing of viscous fluid through the passage hole 31b. Further, the second flange 44 may be constituted by an annular member (not shown) provided separately from the fit member 45 and securely fitted on the fit member 45 or piston rod 4.

In the drawings, reference numeral 5 designates a coiled spring arranged so as to constantly urge the piston 3 toward the original position. In the illustrated embodiment, the spring 5 is positioned between the second flange 44 and a bottom surface of the cylinder 2 in the liquid chamber defined by cooperation of the first and second hollow sections 21 and 22. Alternatively, the spring 5 may be arranged in any other suitable manner. For example, it may be arranged around a portion of the piston rod 4 projected from the cover member 25.

Now, the manner of operation of the shock absorber of the illustrated embodiment thus constructed will be described hereinafter.

When the piston rod 4 is forced due to abutment of an object to be controlled (hereinafter referred to as "controlled object") against the proximal end 41 of the piston rod 4 or the like, the piston 3 is moved toward the bottom wall 23 of the cylinder 2. This causes the first flange 43 of the piston rod 4 to be abutted against the end wall 31 of the piston 3, resulting in closing the viscous fluid passage hole 31b, so that transfer of viscous fluid in the peripheral wall 32 of the piston 3 to a gap between the piston 3 and the first hollow section 21 of the cylinder 2 may be carried out through only the orifices 32a. Flowing of the viscous fluid through the orifices 32a causes generation of dynamic pressure resistance and viscosity resistance, which permit movement of the piston 3 and piston rod 4 to be rendered slow, resulting in shock of the controlled object being alleviated. When the piston 3 is further moved in the second hollow section 22 of the cylinder 2, the orifices 32a are closed in order upwardly from a side of the open end of the piston 3 by the inner surface of the second hollow section 22. This causes resistance of the viscous fluid to be gradually increased. Then, when the piston 3 is further moved to cause all the orifices 32a to be positioned in the second hollow section 22 of the cylinder 2, the viscous fluid is kept from being transferred, resulting in the shock absorber being rendered locked.

When the piston rod 4 is released from load of the controlled object, the return spring 5 causes only the piston rod 4 to be returned in a moment until the second flange 44 is abutted against an inner surface of the end wall 31 of the piston 3. When the second flange 44 is abutted against the end wall 31 of the piston 3, the first flange 43 is spaced from an outer surface of the end wall 31, to thereby cause a gap to be defined therebetween, so that the viscous fluid passage hole 31b is rendered open. This results in viscous fluid in a gap between an outer surface of the piston 3 and the first hollow section 21 being transferred in a large amount into the piston 3 through the passage hole 31b and the orifices 32a positioned in the first hollow section 21 in order with progress of the return movement, so that the piston 3 and piston rod 4 may be rapidly returned to the original position.

When it is desired that shock absorbing characteristics of the shock absorber are varied depending on a controlled object without varying an external dimension thereof, only adjustment of the number of orifices formed at the piston 3 and/or a diameter thereof is merely required in the illustrated embodiment.

In the embodiment described above, the first and second flanges 43 and 44 are provided on the piston rod, to thereby function as a valve for operating the viscous fluid passage hole 31b of the piston 3. Alternatively, any one of various valve mechanisms conventionally known in the art may be substituted for the flanges 43 and 44. For example, the embodiment may be so constructed that the viscous fluid passage hole 31b is formed with a small-diameter section and a large-diameter section, wherein a ball valve (not shown) is arranged in the large-diameter section. Such construction permits the ball valve to close the small-diameter section during movement of the piston 3 in a direction which permits the shock absorber to exhibit shock absorbing characteristics. Also, it permits the ball valve to be kept separated from the small-diameter section during movement of the piston in a direction of return of the piston, to thereby ensure that viscous liquid is transferred in a large amount through the viscous liquid passage hole 31b.

As can be seen from the foregoing, the shock absorber of the present invention is inherently constructed into a single tube structure, resulting in being reduced in manufacturing cost as compared with the shock absorber of the double tube structure type. Also, the shock absorber of the present invention permits both a diameter of the piston and a wall thickness of the cylinder to be increased as compared with the double tube structure type shock absorber having the same external dimension, to thereby exhibit substantially increased shock absorbing characteristics. Further, in the present invention, the orifices each are formed into a hole-like shape, resulting in facilitating both formation of the orifices and adjustment of shock absorbing characteristics depending on a controlled object, as compared with orifices of the groove-like type.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A shock absorber comprising:

a cylinder charged therein with viscous fluid; and a piston arranged in said cylinder in a manner to be movable therein;

said cylinder being formed therein with a first hollow section of a large diameter and a second hollow section of a small diameter;

said piston being formed into a cylindrical shape and having an end wall provided on one end thereof and a peripheral wall connected to said end wall;

said piston being formed into an outer diameter which permits said piston to be slidably moved in said second hollow section of said cylinder;

said peripheral wall of said piston being formed with a plurality of orifices arranged one after another in a longitudinal axial direction of said cylinder;

whereby said viscous fluid is transferred through said orifices upon movement of said piston.

2. A shock absorber as defined in claim 1, further comprising a piston rod and two flanges;

said end wall of said piston being formed with at least one viscous fluid passage hope;

said end wall of said piston being formed with a piston rod insertion through-hole;

said piston rod being inserted via said piston rod insertion through-hole of said end wall of said piston;

said flanges being arranged so as to be spaced from each other with said end wall of said piston being interposed between said flanges;

one of said flanges being arranged outside said end wall of said piston and formed into a size sufficient to permit said one flange to close said viscous fluid passage hole upon movement of said piston in a direction which permits said shock absorber to exhibit shock absorbing characteristics;

the other of said flanges being formed into a configuration which prevents said the other flange from closing said viscous fluid passage hole when it is abutted against said end wall of said piston.

3. A shock absorber as defined in claim 1, wherein said cylinder comprises a bottom wall for closing one end of said cylinder and a cover member for sealing another end of said cylinder.

4. A shock absorber as defined in claim 1, further comprising a piston rod and two flanges, said flanges being arranged so as to be spaced from each other with said end wall of said piston being interposed between said flanges.

5. A shock absorber as defined in claim 4, wherein said end wall of said piston is formed with at least one viscous fluid passage hole.

6. A shock absorber as defined in claim 4, wherein said end wall of said piston is formed with a piston rod insertion through-hole, said piston rod being inserted via said piston rod insertion through-hole of said end wall of said piston.

7. A shock absorber comprising:
 a cylinder charged therein with viscous fluid, said cylinder being formed therein with a first hollow section of a large diameter and a second hollow section of a small diameter;
 a piston arranged in said cylinder in a manner to be movable therein,
  said piston being formed into a cylindrical shape and having an end wall provided on one end thereof and a peripheral wall connected to said end wall,
  said piston being formed into an outer diameter which permits said piston to be slidably moved in said second hollow section of said cylinder;
  said peripheral wall of said piston being formed with a plurality of orifices, whereby said viscous fluid is transferred through said orifices upon movement of said piston,
  said end wall of said piston being formed with at least one viscous fluid passage hole,
  said end wall of said piston being formed with a piston rod insertion through-hole; and
 a piston rod and two flanges,
  said piston rod being inserted via said piston rod insertion through-hole of said end wall of said piston,
  said flanges being arranged so as to be spaced from each other with said end wall of said piston being interposed between said flanges,
  a first one of said flanges being arranged outside said end wall of said piston and formed into a size sufficient to permit said first flange to close said viscous fluid passage hole upon movement of said piston in a direction which permits said shock absorber to exhibit shock absorbing characteristics,
  a second one said flanges being formed into a configuration which prevents said second flange from closing said viscous fluid passage hole when said second flange is abutted against said end wall of said piston.

8. A shock absorber as defined in claim 7, wherein said orifices are arranged one after another in an axial direction of said piston.

9. A shock absorber comprising:
 a cylinder charged therein with viscous fluid;
 a piston arranged in said cylinder in a manner to be movable therein;
  said cylinder being formed therein with a first hollow section of a large diameter and a second hollow section of a small diameter;
  said piston being formed into a cylindrical shape and having an end wall provided on one end thereof and a peripheral wall connected to said end wall;
  said piston being formed into an outer diameter which permits said piston to be slidably moved in said second hollow section of said cylinder;
  said peripheral wall of said piston being formed with a plurality of orifices arranged one after another in an axial direction of said piston whereby said viscous fluid is transferred through said orifices upon movement of said piston; and
 a piston rod and two flanges, said flanges being arranged so as to be spaced from each other with said end wall of said piston being interposed between said flanges.

10. A shock absorber as defined in claim 9, wherein said end wall of said piston is formed with at least one viscous fluid passage hole.

11. A shock absorber as defined in claim 9, wherein said end wall of said piston is formed with a piston rod insertion through-hole, said piston rod being inserted via said piston rod insertion through-hole of said end wall of said piston.

* * * * *